(12) United States Patent
Cloots et al.

(10) Patent No.: US 6,340,496 B1
(45) Date of Patent: Jan. 22, 2002

(54) METHOD FOR PATTERNING A LAYER OF CONDUCTIVE POLYMERS

(75) Inventors: Tom Cloots, Londerzeel; Roger Van den Bogaert, Schoten; Jean-Pierre Tahon, Langdorp; Frank Louwet, Diepenbeek, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/573,549

(22) Filed: May 19, 2000

Related U.S. Application Data

(60) Provisional application No. 60/137,275, filed on Jun. 1, 1999.

(30) Foreign Application Priority Data

May 20, 1999 (EP) .............................................. 99201645

(51) Int. Cl.$^7$ ................................................. B05D 5/12
(52) U.S. Cl. ........................... 427/58; 427/96; 427/261; 427/286; 427/341
(58) Field of Search ........................... 427/58, 96, 261, 427/286, 341

(56) References Cited

U.S. PATENT DOCUMENTS

| 4,699,804 A | * | 10/1987 | Miyata et al. ............... 427/108 |
| 4,959,430 A | | 9/1990 | Jonas et al. |
| 5,561,030 A | * | 10/1996 | Holdcroft et al. ........... 430/311 |
| 5,766,515 A | * | 6/1998 | Jonas et al. .................. 252/500 |

FOREIGN PATENT DOCUMENTS

| EP | 0 615 256 A2 | | 9/1994 |
| EP | 0 615 256 A3 | | 9/1994 |
| EP | 1079397 | * | 2/2001 |
| WO | WO 97/18944 | | 5/1997 |

* cited by examiner

Primary Examiner—Erma Cameron
(74) Attorney, Agent, or Firm—Breiner & Breiner, L.L.C.

(57) ABSTRACT

A method for producing electrode pattern in a conductive polymer on a substrate comprising the steps of applying a layer containing between 10 and 5000 mg/m$^2$ of a conductive polymer, so as to prepare a conductive layer and printing an electrode pattern on said layer using a printing solution containing of an oxidant selected from the group consisting of $ClO^-$, $BrO^-$, $MnO_4^-$, $Cr_2O_7^{--}$, $S_2O_8^{--}$ and $H_2O_2$.

7 Claims, No Drawings

METHOD FOR PATTERNING A LAYER OF CONDUCTIVE POLYMERS

DESCRIPTION

This application claims the benefit of U.S. Provisional Application No. 60/137,275, filed Jun. 1, 1999.

FIELD OF THE INVENTION

This invention relates to intrinsic conductive polymers. In particular to the patterning of layers of such polymers in order to form electrodes on said layers.

DETAILED DESCRIPTION

It is known in the art of fabrication of flexible LC displays, electroluminescent devices and so on to replace the transparent ITO (Indium-Tinoxide) electrodes by transparent electrodes made with intrinsically conductive polymers as e.g. polyacetylene, polypyrrole, polyaniline, polythiophene, etc. The advantage of this replacement resides mainly in the fact that electrodes made with conductive polymers are much more flexible and less brittle than ITO electrodes so that, especially in the manufacture of touch screens, where high flexible electrodes are needed, the lifetime of the device can be prolonged.

Different methods for forming tracks of electrodes made from intrinsic conductive polymers have been disclosed. In WO-A-97 18944 a continuous layer of a conductive polymer is applied to the substrate, a mask is applied on top of said layer and the no masked parts are etched. After washing the mask away a pattern of electrodes is produced. In U.S. Pat. No. 5,561,030 basically the same procedure is used to form the pattern except for the fact that the pattern is formed in a continuous layer of prepolymer which is not yet conductive and that after washing the mask away the remaining prepolymer is rendered conductive by oxidation.

In U.S. Pat. No. 4,699,804 it is disclosed to apply a pattern of a polymerization catalyst to a substrate and on that pattern a polymerizable compound. After reaction between the polymerization catalyst and the polymerizable compound a pattern of conductive polymer is formed.

All methods above use some kind of lithography and etching processes as known from the classical PCB production and require a plurality of steps to be performed. There is thus a need to have a simple process, requiring a low number of steps, to prepare substrate with an electrode pattern.

OBJECTS AND SUMMARY OF THE INVENTION

It is an object of the invention to provide a method for producing tracks of electrodes on a substrate wherein said electrodes are made of intrinsically conducting polymers requiring only a few number of process steps.

It is a further object of the invention to provide a method for producing tracks of electrodes on a substrate, said electrodes being made of intrinsically conducting polymers, wherein said tracks are formed by digital printing means.

Further objects and advantages of the invention will become clear from the description herein after.

The objects of the invention are realized by providing a method for producing a pattern of electrodes in a conductive polymer on a substrate comprising the steps of
  applying a layer containing between 10 and 5000 mg/m² of a conductive polymer on a substrate so as to prepare a conductive layer and
  printing an pattern on said layer using a printing solution containing of an oxidant selected from the group consisting of $ClO^-$, $BrO^-$, $MnO_4^-$, $Cr_2O_7^{--}$, $S_2O_8^{--}$ and $H_2O_2$

DETAILED DESCRIPTION OF THE INVENTION

It was found that an electrode pattern on a substrate wherein the electrodes are formed by a conductive polymer could be produced by applying a conductive layer on the substrate and then printing a pattern on said layer using a printing solution containing an oxidant. It was found that by printing a solution containing an oxidant the conductivity of the polymeric layer could be changed (diminished) by a factor between $10^3$ and $10^{11}$ without changing the thickness of the layer. This is advantageous, especially when the electrode pattern is used in displays as, e.g., LCD's, since it makes it possible to use fewer spacing particles.

It is preferred to use an oxidant selected from the group consisting of $ClO^-$, $BrO^-$, $MnO_4^-$, $Cr_2O_7^{--}$, $S_2O_8^{--}$ and $H_2O_2$. It is highly preferred to use $ClO^-$ or $MnO_4^-$ as oxidant. The use of $MnO_4^-$ has the advantage that the influence on the conductivity of the conductive polymer is in a pH-range from 3 to 10 almost independent of the pH of the printing solution containing the $MnO_4^-$ ions, so that no problems with aging of the printing solution are encountered. The use of $ClO^-$ as oxidant has the advantage that the printing solution can be used in low concentration or that, with printing solution containing a fairly high concentration, a small amount of printing solution can be used, thus avoiding problems with drying and spreading of the solution, which makes it possible to print lines as narrow as 5 μm. Therefore the use of $ClO^-$ is most preferred.

The printing can proceed by offset printing, screen-printing or ink-jet printing.

Using a printing solution with a low concentration of $ClO^-$ as oxidant makes it possible to prepare an ink that has a sufficient oxidizing strength to change the conductivity of the conductive layer, but that is not so corrosive that it would be unusable in ink jet printing devices. The use of ink-jet printing devices has the advantage that no screens are necessary and that the electrode layout can be printed directly from the computer on the conductive layer.

For adjusting the viscosity of the solutions, a thickener is added selected from the group consisting of silica, silicates, clay, synthetic clays, e.g. the clays sold under trade name LAPONITE, and polymeric thickeners.

Optionally for easy printing the printing solution may comprise surfactants.

Although the printing works with layers containing any intrinsically conductive polymer known in the art, e.g., polyacetylene, polypyrrole, polyaniline, polythiophene, etc., it is preferred to use layers prepared by applying a mixture containing
(a) a polythiophene with formula

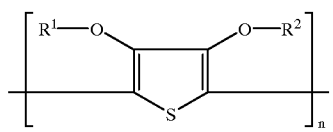

wherein each of R1 and R2 independently represents hydrogen or a C1–4 alkyl group or together represent an optionally substituted C1–4 alkylene group or a cycloalkylene group, preferably an ethylene group, an optionally alkyl-substituted methylene group, an optionally C1–12 alkyl- or phenyl-substituted 1,2-ethylene group, a 1,3-propylene group or a 1,2-cyclohexylene group, (b) a polyanion compound and
(c) an organic compound containing 2 or more OH and/or COOH groups or amide or lactam groups. Such layers have been described in EP-A-686 662.

The printing can proceed on layers containing of a polyethylene-di-oxythiophene, polystyrenesulphonic acid wherein between 10 and 5000 mg/m² of the polythiophene is present, preferably layers wherein between 50 and 1000 mg/m² of the polythiophene is present are used and more preferably layers wherein between 75 and 500 mg/m² of the polythiophene is present are used. The layers comprising a conductive polymer and printed in the method of this invention can have any conductivity. The method of this invention can, e.g., be used to pattern layers with conductivity between 1 and $10^5$ S/cm. Preferably the conductive layers patterned by the method of this invention have conductivity between 5 and $10^4$ S/cm, more preferably between 10 and 1000 S/cm.

EXAMPLES

1 Preparation of the Polythiophene Dispersion (PT) (Hereinafter Called Dispersion PT)

a) Into 1000 ml of an aqueous solution of 14 g of polystyrene sulphonic acid (218 mmol of $SO_3H$ groups) with number-average molecular weight (Mn) 40,000, were introduced 12.9 g of potassium peroxodisulfate ($K_2S_2O_8$), 0.1 g of $Fe_2(SO_4)_3$ and 5.68 g of 3,4-ethylenedioxy-thiophene. The thus obtained reaction mixture was stirred for 24 h at 20° C. and subjected to desalting.

b) 500 ml of the above prepared reaction mixture were diluted with 500 ml of water and stirred for 6 hours at room temperature in the presence of a granulated weak basic ion exchange resin LEWATIT H 600 (trade name of Bayer AG, Leverkusen, Germany) and strongly acidic ion exchanger LEWATIT S 100 (trade name of Bayer AG, Leverkusen, Germany). After said treatment the ion exchange resins were filtered off and the potassium ion and sulfate ion content were measured which were respectively 0.4 g $K^+$ and 0.1 g $(SO_4)^{2-}$ per liter.

Example 1

417 ml of dispersion PT and 50 g of methylpyrrolidone (compound A) were mixed with a binder (8.5 ml of a 30 % dispersion of co(vinylidenechloride/methylacrylate/itaconic acid 88/10/2) and a surfactant (0.5 ml of FLUORAD FC430, trade name of 3M) and the mixture was brought to 1000 ml with distilled water.

This mixture was coated on a 100 μm thick polyethyleneterephthalate film whereon a subbing layer (as usual on supports for photographic material) was present. The mixture was coated at a wet thickness of 40 mμ, and dried at a temperature of 35° C.

The dried layer contained 200 mg/m² of polythiophene.

The resistivity in Ω/square was measured as described above and was 680 Ω/square.

Printing Example 1

On the layer a pattern was printed with screen-printing using a printing solution containing $ClO^-$ so that 25 mg/m² of NaClO was present. After printing the printing solution was washed away. The conductivity of the printed pattern was $10^{11}$ times lower than the conductivity of the conductive layer.

Printing Example 2

On the layer a pattern was printed with screen-printing using a printing solution containing $MnO_4^-$ at pH=3, so that 667 mg/m² of $KMnO_4$ was present. After printing the printing solution was washed away. The conductivity of the printed pattern was $10^7$ times lower than the conductivity of the conductive layer.

Printing Example 3

On the layer a pattern was printed with screen-printing using a printing solution containing $MnO_4^-$ at pH=10, so that 667 mg/m² of $KMnO_4$ was present. After printing the printing solution was washed away. The conductivity of the printed pattern was $10^7$ times lower than the conductivity of the conductive layer.

Printing Example 4

On the layer a pattern was printed with screen printing using a printing solution containing $(NH_4)_2S_2O_8$ at pH=10, so that 125 mg/m² of $(NH_4)_2S_2O_8$ was present. After printing the printing solution was washed away. The conductivity of the printed pattern was $10^6$ times lower than the conductivity of the conductive layer

Printing Example 5

On the layer a pattern was printed with screen printing using a printing solution containing $(NH_4)_2S_2O_8$ at pH=2.6, so that 125 mg/m² of $(NH_4)_2S_2O_8$ was present. After printing the printing solution was washed away. The conductivity of the printed pattern was $10^3$ times lower than the conductivity of the conductive layer

Printing Example 6

On the layer a pattern was printed with screen-printing using a printing solution containing $KIO_3$ at pH=2, so that 1250 mg/m² of $KIO_3$ was present. After printing the printing solution was washed away. The conductivity of the printed pattern was only 4 times lower than the conductivity of the conductive layer. Thus this oxidant is not useful in the method of this invention.

What is claimed is:

1. A method for producing electrode pattern in a conductive polymer on a substrate comprising the steps of applying a layer containing between 10 and 5000 mg/m² of a conductive polymer, so as to prepare a conductive layer and printing an electrode pattern on said layer using a printing solution containing of an oxidant selected from the group consisting of $ClO^-$, $BrO^-$, $MnO_4^-$, $Cr_2O_7^{--}$, $S_2O_8^{--}$ and $H_2O_2$.

2. A method according to claim 1, wherein said conductive layer has a conductivity between 1 and $10^5$ S/cm.

3. A method according to claim 1, wherein said conductive polymer has formula:

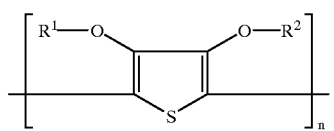

in which, each of $R^1$ and $R^2$ independently represents hydrogen or a C1–4 alkyl group or together represent a C1–4 alkylene group or a cycloalkylene group, preferably an ethylene group, a methylene group, a C1–12 1,2-ethylene group, a 1,3-propylene group or a 1,2-cyclohexylene group.

4. A method according to claim 3, wherein said conductive polymer is applied from an aqueous solution containing a polyanion compound.

5. A method according to claim 1, wherein said printing proceeds by a printing method selected from the group consisting of offset printing, screen printing and ink-jet printing.

6. A method according to claim 1, wherein said printing proceeds so as to apply between 25 and 800 mg/m$^2$ of oxidant.

7. A method according claim 1, wherein said printing solution comprises a thickener selected from the group consisting of silica, silicates, clay, synthetic clay and polymeric thickeners.

* * * * *